United States Patent [19]
Lin

[11] Patent Number: 5,805,436
[45] Date of Patent: Sep. 8, 1998

[54] SIMPLIFIED POWER SUPPLY CIRCUIT WITHOUT TRANSFORMER CORE AND WINDINGS

[76] Inventor: Tieng-fu Lin, P.O. Box 55-846, Taipei, Taiwan

[21] Appl. No.: 826,069

[22] Filed: Mar. 24, 1997

[51] Int. Cl.[6] ..................................................... H02M 3/18
[52] U.S. Cl. .............................. 363/60; 320/166; 307/110
[58] Field of Search ................................... 307/109, 110; 320/166; 363/59, 60, 61; 323/282, 288

[56] References Cited

U.S. PATENT DOCUMENTS 5,581,454  12/1996  Collins ........................................ 363/59

*Primary Examiner*—Peter S. Wong
*Assistant Examiner*—Y. J. Han

[57] ABSTRACT

A simplified power supply circuit includes: a primary capacitor connected across an anode and a cathode of a rectifier for rectifying an input voltage of high voltage and low current of AC current, a plurality of secondary capacitors connected in series in between a positive pole and a negative pole of the primary capacitor through a positive-pole on-off switch and a negative-pole on-off switch, each secondary capacitor having its positive and negative conductors respectively connected to an output positive terminal and an output negative terminal by an on-off switch circuit, and the secondary capacitors having their output positive and negative terminals connected in parallel for amplifying the low input current (with high voltage) to be a high output current (with low voltage) without using the heavy iron core and winding of a conventional transformer.

12 Claims, 2 Drawing Sheets

SIMPLIFIED POWER SUPPLY CIRCUIT WITHOUT TRANSFORMER CORE AND WINDINGS

BACKGROUND OF THE INVENTION

A conventional transformer used to step up or step down voltage for power supply includes a primary winding and a secondary winding placed on a iron core which is very heavy and is inconvenient for portable use.

If such a heavy transformer with iron core and windings is provided for a DC adapter such as used for powering a miniature electronic product, for instance, a radio, a recorder, and a walkman (mini cassette tape player), it will increase inconvenience for the user of the electronic product, especially when used in travelling.

The present inventor has found the drawbacks of the conventional power supply with transformer having iron core and windings.

SUMMARY OF THE INVENTION

The object of the present invention is to provide a simplified power supply circuit including: a primary capacitor connected across an anode and a cathode of a rectifier for rectifying an input voltage of high voltage and low current of AC current, a plurality of secondary capacitors connected in series in between a positive pole and a negative pole of the primary capacitor through a positive-pole on-off switch and a negative-pole on-off switch, each secondary capacitor having its positive and negative conductors respectively connected to an output positive terminal and an output negative terminal by an on-off switch circuit, and the secondary capacitors having their output positive and negative terminals connected in parallel for amplifying the low input current (with high voltage) to be a high output current (with low voltage) without using the heavy iron core and winding of a conventional transformer.

DETAILED DESCRIPTION

Figure 1:
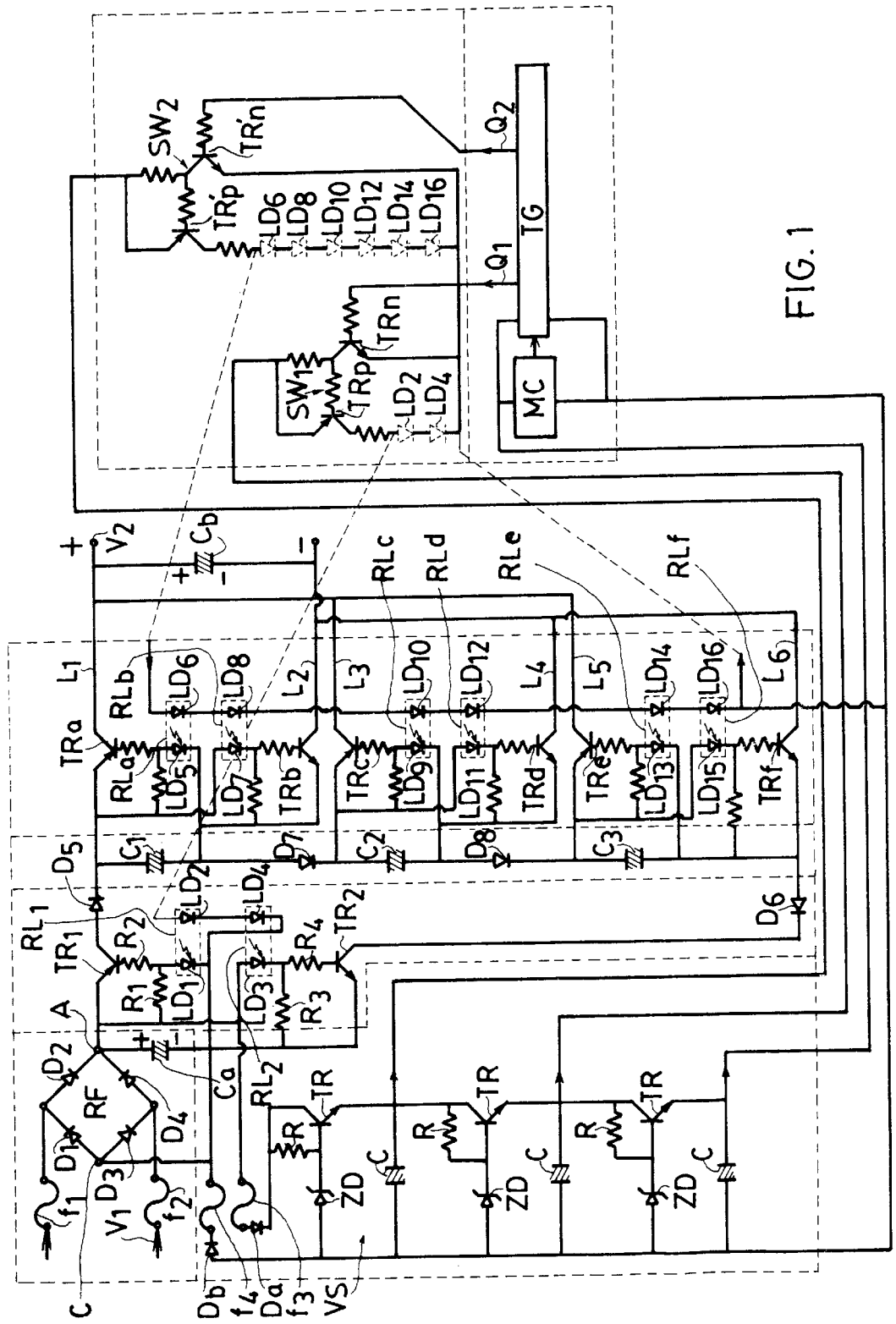
FIG. 1 is an electronic circuit diagram of the present invention of a current amplifier.

As shown in FIG. 1, a current amplifier according to the present invention comprises: a rectifier RF for rectifying an input voltage V1 of low current and high voltage of AC current; a primary capacitor Ca having its positive pole connected to an anode A of the rectifier RF and having a negative pole of the primary capacitor Ca connected to a cathode C of the rectifier RF; a plurality of secondary capacitors C1, C2, C3 connected in series between the positive pole and the negative pole of the primary capacitor Ca through a positive-pole on-off switch TR1 and a negative-pole on-off switch TR2, with the positive-pole on-off switch TR1 connected between the positive pole of the primary capacitor Ca and a positive conductor of a first secondary capacitor C1 through a first forward-current diode D5 for preventing a reverse flow of a charging current for charging the plurality of the secondary capacitors C1, C2, C3 from the primary capacitor Ca, and with the negative-pole on-off switch TR2 connected between a negative conductor of a third or last secondary capacitor C3 and the negative pole of the primary capacitor Ca through a second forward-current diode D6 for preventing a reverse flow of the charging current from the primary capacitor Ca towards the secondary capacitors C1 or C2 or C3; each secondary capacitor C1 or C2 or C3 having a positive conductor electrically connected to an output positive terminal L1 or L3 or L5 through a positive-conductor on-off switch TRa or TRc or TRe; each secondary capacitor C1, C2, C3 having a negative conductor electrically connected to an output negative terminal L2 or L4 or L6 through a negative-conductor on-off switch TRb or TRd or TRf; and all the output positive and negative terminals (L1, L2; L3, L4; and L5, L6) of all secondary capacitors being connected in parallel to have an overall output voltage V2 between the two output terminals (L1, L2; L3, L4; and L5, L6).

By designing each capacitor Ca, C1, C2, C4 to have a same capacitance and if the input voltage Vi having an input current of one ampere, the output current of the output voltage V2 will be 3 amperes (1×3=3) to thereby amplify the low input current to be a higher output current for efficiently charging a DC electronic equipment (not shown). Naturally, the output voltage V2 is then decreased to be V1/3.

For stabilizing the output current at the output terminals L1, L2, an output capacitor Cb is provided across the two output terminals L1, L2.

The rectifier RF of the present invention may be a bridge rectifier consisting of four diodes, i.e., a first diode D1, a second diode D2, a third diode D3 and a fourth diode D4. An alternating current (AC) of input voltage V1 is applied through a pair of fuses f1, f2 to a first junction point between the first diode D1 and the second diode D2 and a second junction point between the third diode D3 and the fourth diode D4, to be rectified to obtain a DC current output from an anode A between D2, D4 and a cathode C between D1, D3 of the bridge rectifier RF. The DC current from the rectifier RF is applied to the positive pole and negative pole of the primary capacitor Ca.

Between every two neighboring secondary capacitors (between C1 and C2; and between C2 and C3), a forward-current diode D7 or D8 is provided therebetween for ensuring a forward flow of the charging current from the primary capacitor Ca towards the secondary capacitors C1, C2, C3 and for preventing a reverse flow of the forward charging current.

Even though the number of secondary capacitors C1, C2, C3 are only three, the number of the secondary capacitors are not limited in this invention, which can be designated as: C1, C2, C3 . . . Cn for a total number of "n".

The positive-pole on-off switch TR1 as shown in FIG. 1 is a PNP transistor TR1 having an emitter connected to the positive pole of the primary capacitor Ca, a collector connected to the positive pole of the first secondary capacitor C1 through the forward-current diode D5 and a base connected to the negative pole of the primary capacitor Ca through a current limit resistor R2 for providing a negative biasing voltage to the base for conducting the PNP transistor TR1 and a first relay RL1 actuated by a first amplifying switch SW1 as controlled by a timing control circuit including a master clock MC and a timing generator TG; with a cut-off resistor R1 connected between the base of the PNP transistor TR1 and the positive pole of the primary capacitor Ca for providing a cut-off current of the base of the PNP transistor TR1 for turning off the transistor TR1.

The first relay RL1 includes a photodiode LD1 electrically connected between the base of the PNP transistor TR1 and the negative pole of the primary capacitor Ca, and a light-emitting diode LD2 electrically connected to the first amplifying switch SW1 as controlled by the timing control circuit.

The negative-pole on-off switch TR2 as shown in FIG. 1 is a NPN transistor TR2 having an emitter connected to the negative pole of the primary capacitor Ca, a collector connected to the negative pole of the last secondary capacitor C3 through the forward-current diode D6 and a base connected to the positive pole of the primary capacitor Ca through a current limit resistor R4 for providing a positive biasing voltage to the base for conducting the NPN transistor TR2 and a second relay RL2 synchronously actuated by the first amplifying switch SW1 as controlled by a timing control circuit including a master clock MC and a timing generator TG; with a cut-off resistor R3 connected between the base of the NPN transistor TR2 and the negative pole of the primary capacitor Ca for providing a cut-off current of the base of the NPN transistor TR2 for turning off the transistor TR2.

The second relay RL2 includes a photodiode LD3 electrically connected between the base of the NPN transistor TR2 and the positive pole of the primary capacitor Ca, and a light-emitting diode LD4 electrically connected to the negative pole of the primary capacitor Ca and connected in series with the light-emitting diode LD2 which is connected to the first amplifying switch SW1 as controlled by the timing control circuit.

The first amplifying switch SW1 is electrically connected to the positive pole of the primary capacitor Ca through a voltage stabilizing circuit VS; and electrically connected to the negative pole of the primary capacitor Ca through the light-emitting diode LD2 and the light-emitting diode LD4; whereby upon receiving of a timing instruction signal Q1 from the timing generator TG which receives clock pulses from the master clock MC, the first amplifying switch SW1 will be turned on to conduct the light-emitting diodes LD2, LD4 for lighting and conducting the photodiodes LD1, LD3 for turning on the PNP transistor TR1 and NPN transistor TR2 for charging the secondary capacitors C1, C2, C3 by transferring the charges as stored on the primary capacitor Ca, which is charged by a DC current as rectified by the rectifier RF.

The master clock or oscillator MC and the timing generator TG are electrically connected to and powered by a voltage stabilizing circuit VS including at least a Zener diode ZD, a transistor TR and a resistor R as shown in FIG. 1, with the voltage stabilizing circuit VS connected to the positive and negative poles of the primary capacitor Ca through a pair of fuses f3, f4 and a pair of diodes Da, Db.

Each secondary capacitor C1 (or C2, or C3) has its positive conductor connected to an output positive terminal L1 (or L3 or L5) through a positive-terminal on-off switch TRa (or TRc, or TRe), and a negative conductor of the secondary capacitor C1 (or C2, or C3) connected to an output negative terminal L2 (or L4, or L6) through a negative-terminal on-off switch TRb (or TRd, or TRf), with the output positive terminals (L1, L3, L5) and the output negative terminals (L2, L4, L6) connected in parallel for an output voltage V2 between two output terminals.

The positive-conductor on-off switch TRa (or TRc, or TRe) is a PNP transistor having an emitter connected to a positive conductor of the secondary capacitor C1 (or C2, or C3), a collector connected to the output positive terminal L1 (or L3, or L5) and a base connected to the negative conductor of the secondary capacitor C1 (or C2, or C3) through a negatively biasing relay RLa which is actuated by a second amplifying switch SW2 as controlled by the timing control circuit including the master clock MC and the timing generator TG. A current limit resistor and a cut-off resistor may also be connected to the transistor TRa or TRb.

The negative-conductor on-off switch TRb (or TRd, or TRf) is a NPN transistor having an emitter connected to a negative conductor of the secondary capacitor C1 (or C2, or C3), a collector connected to the output negative terminal L2 (or L4, or L6) and a base connected to the positive conductor of the secondary capacitor through a positively biasing relay RLb which is synchronously actuated by the second amplifying switch SW2 as controlled by the timing control circuit (MC, TG).

The transistors, the relays and the amplifying switches of the present invention may be substituted with other switching means for the on-off control of the charging or discharging of the capacitors Ca, C1, C2, C3.

The amplifying switch SW1, SW2 may be a transistor or transistor pairs as shown in FIG. 1, not limited in the present invention. As shown in FIG. 1, when the timing instruction signal Q1 (Q2) actuates to conduct the NPN transistor TRn (TR'n), then the PNP transistors TRp (TR'p) will be conducted to actuate the relays RL1, RL2, (RLa, RLb) for turning on the transistors TR1, TR2 (TRa, TRb).

The negatively biasing relay RLa includes a photodiode LD5 electrically connected between the base of the PNP transistor TRa and the negative conductor of the secondary capacitor C1, and a light-emitting diode LD6 electrically connected to the second amplifying switch SW2 as controlled by the timing control circuit.

The positively biasing second relay RLb includes a photodiode LD7 electrically connected between the base of the NPN transistor TRb and the positive conductor of the secondary capacitor C1, and a light-emitting diode LD8 electrically connected to the negative conductor of the secondary capacitor and connected in series with the light-emitting diode LD6 which is connected to the second amplifying switch SW2 as controlled by the timing control circuit.

Other light-emitting diodes LD10, LD12, LD14, LD16 are connected in series with the light-emitting diodes LD6, LD8 and connected to the second amplifying, switch SW2 which is electrically connected between the positive and negative poles of the primary capacitor Ca through a voltage stabilizing circuit VS.

When an alternating current of input voltage V1 is applied to the rectifier RF, it will be rectified to be a direct current to charge the primary capacitor Ca. After a predetermined time period by giving a timing instruction signal Q1 to actuate the amplifying switch SW1 to conduct LD2, LD1, LD4, LD3 to turn on the transistors TR1, TR2 to transfer the charge from the primary capacitor CA to the plurality of secondary capacitors C1, C2, C3 for charging the secondary capacitors. Upon receiving of the second timing instruction signal Q2 from the timing control circuit (the transistor TR1, TR2 will also be turned off), the amplifying switch SW2 will be actuated to conduct LD6, LD5, LD8, LD7, LD10, LD9, LD12, LD11, LD14, LD13, LD16 and LD15 to turn on the transistors TRa, TRb, TRc, TRd, TRe, and TRf simultaneously to transfer the charges from the secondary capacitors C1, C2, C3 to the output terminals for final use such as for charging a DC electronic instrument or equipment. Since all outputs of the secondary capacitors are connected in parallel, the output current of output voltage V2 will be amplified (Note: The output voltage V2 is decreased to be V1/3). Meanwhile, the heavy core and windings as found in a conventional iron-core transformer have been eliminated. The electronic elements such as the diodes, transistors, capacitors and other elements will only require a small volume, thereby building a compact light-weight power supply unit in accordance with the present invention.

The present invention may also be input with direct-current static electricity with small current and high voltage, which is then converted as an output of high-current and low-voltage.

Also, an input voltage as picked up from the positive and negative terminals of a sky lightning may also be fed into the present invention for charging the capacitors C1 . . . Cn from which the charges are then output for end uses.

Figure 2:
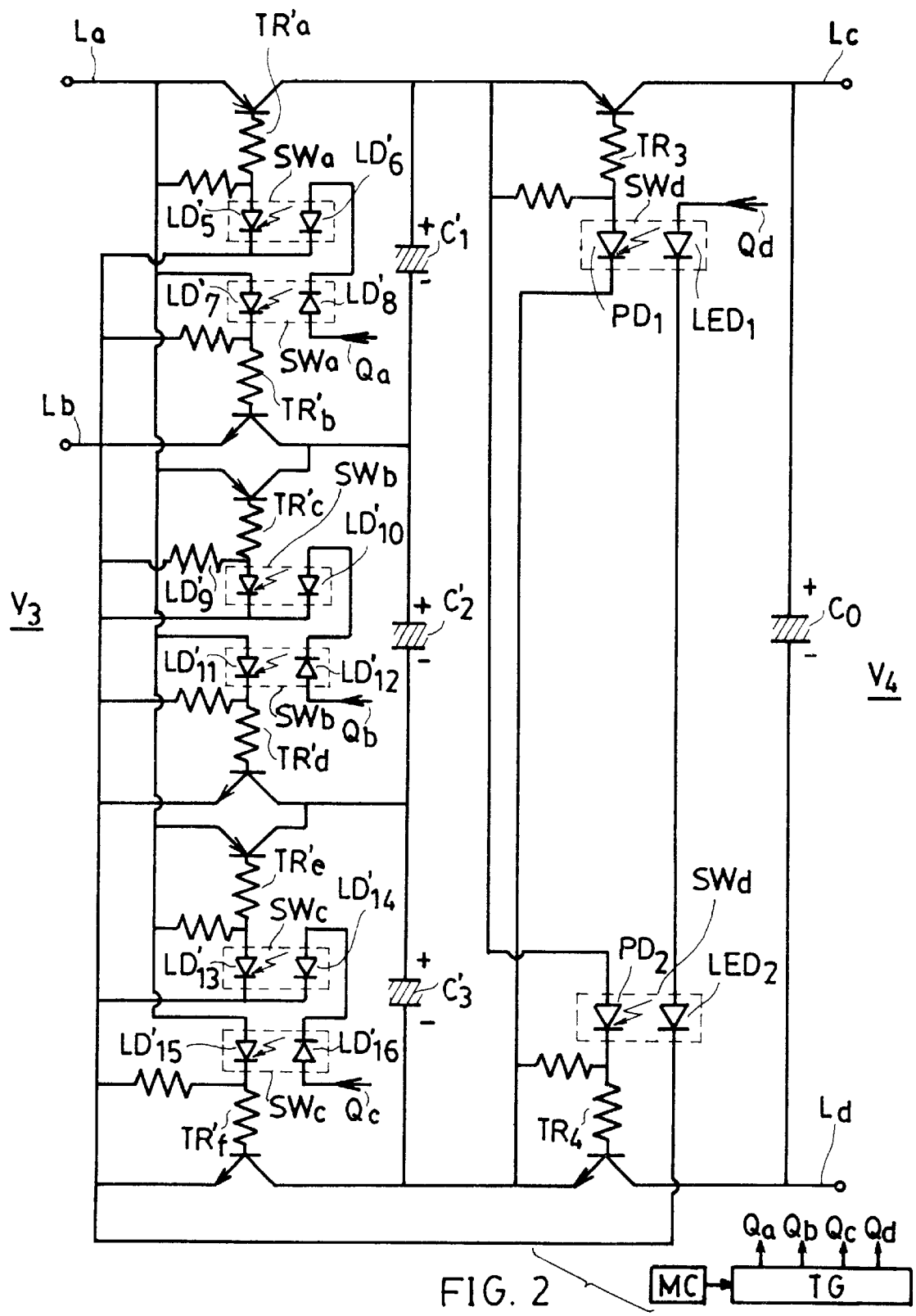
FIG. 2 is an electronic circuit diagram of the present invention of a voltage amplifier.

Another preferred embodiment of the present invention is shown in FIG. 2, which is a simplified power supply circuit of voltage amplifier, as modified from the aforesaid current amplifier as shown in FIG. 1.

The simplified power supply circuit of voltage amplifier as shown in FIG. 2 comprises: a plurality of charging capacitors C'1, C'2, C'3 connected in series; each charging capacitor having its positive conductor connected to an input positive pole La of the input voltage V3 of direct current through a PNP transistor TR'a (or TR'c, or TR'e) and having a negative conductor of the charging capacitor connected to an input negative pole Lb of the input voltage V3 through a NPN transistor TR'b (or TR'd or TR'f). All the charging capacitors C'1, C'2, C'3 have their input positive and negative poles La, Lb connected in parallel.

The PNP transistor TR'a for the first capacitor C'1 includes: an emitter connected to the input positive pole La, a collector connected to the positive conductor of the charging capacitor, and a base connected to the input negative pole Lb through a relay SWa.

The NPN transistor TR'b for the first capacitor C'1 includes: an emitter connected to the input negative pole Lb, a collector connected to the negative conductor of the charging capacitor, and a base connected to the input positive pole La through a relay SWa.

Each relay SWa includes a photodiode LD'5 or LD'7 and a light-emitting diode LD'6 or LD'8 operatively actuated by a first timing instruction signal Qa as given from a timing control circuit including a master clock MC and a timing generator TG.

The second capacitor C'2 is provided with transistors TR'c, TR'd respectively connected with two relays SWb each relay SWb including a photodiode LD'9 or LD'11 and a light-emitting diode LD'10 or LD'12, and actuated by a second timing instruction signal Qb.

The third or last capacitor C'3 is provided with transistors TR'e, TR'f respectively connected with two relays SWc each relay SWc including photodiode LD'13 or LD'15, and light-emitting diode LD'14 or LD'16, and actuated by a third timing instruction signal Qc.

An output capacitor Co has a positive conductor connected to an output positive terminal Lc which is connected to a positive conductor of the first charging capacitor C'1 through a PNP transistor TR3, and a negative conductor of the output capacitor Co connected to an output negative terminal Ld which is connected to a negative conductor of the last charging capacitor C'3 through a NPN transistor TR4, with the output voltage V4 across the output positive terminal Lc and the negative terminal Ld being an overall output voltage of the plurality of charging capacitors C'1, C'2, C'3 connected in series.

The PNP transistor TR3 has an emitter connected to the positive conductor of the first charging capacitor C'1, a collector connected to the output positive terminal Lc, and a base connected to the negative conductor of the last capacitor C'3 through a relay SWd including a photodiode PD1 and a light-emitting diode LED1 actuated by a timing instruction signal Qd given from a timing control circuit MC, TG for conducting the relay SWd and turning on the PNP transistor TR3.

The NPN transistor TR4 has an emitter connected to the negative conductor of the last capacitor C'3, a collector connected to the output negative terminal Ld, and a base connected to the positive conductor of the first capacitor C'1 through a relay SWd including a photodiode PD2 and a light-emitting diode LED2 actuated by a timing instruction signal Qd given from a timing control circuit MC, TG for conducting the relay SWd and the NPN transistor TR4 simultaneously with the conducting of PNP transistor TR3 for outputing the charges as stored on the charging capacitors C'1, C'2, C'3 through the two output terminals Lc, Ld when the transistors TR'a–TR'f are turned off. The charges of output voltage V4 may also be charged into the output capacitor Co for storing the output electrical energy. The timing instruction signals Qa–Qd are given from timing generator TG sequentially. The signal sequence of Qa–Qc is provided for stepping up the voltage from V3 to be 3×V3 which is then output as instructed by the final signal Qd.

By the way, the input voltage V3 after being amplified through the voltage amplifier as shown in FIG. 2 will be amplified to be 3V3, namely V4=3V3.

The voltage amplifier is also light in weight, compact in volume and convenient for portable uses.

The present invention may be modified without departing from the spirit and scope of this invention. The number of capacitors as connected in series are not limited in this invention. The current limit resistor and cut-off resistor may be provided in the related transistors as shown in FIG. 2, not limited in this invention.

The output power of the present invention may be used for charging a DC electric car or electric bicycle, and other electric equipments.

I claim:

1. A simplified power supply circuit of current amplifier comprising: a primary capacitor connected across an anode and a cathode of a rectifier for rectifying an input voltage of high voltage and low current, a plurality of secondary capacitors connected in series in between a positive pole and a negative pole of the primary capacitor through a positive-pole on-off switch and a negative-pole on-off switch, each of said secondary capacitors having a positive and negative conductor respectively connected to an output positive and negative terminal by an on-off switch circuit, and the secondary capacitors having their output positive and negative terminals connected in parallel for amplifying the input voltage of low current to be an output voltage of high current;

said positive-pole on-off switch being a PNP transistor TR1 having an emitter connected to the positive pole of the primary capacitor Ca, a collector connected to the positive pole of the first secondary capacitor C1 through a forward a current diode D5 and a base connected to the negative pole of the primary capacitor Ca through a current limit resistor R2 for providing a negative biasing voltage to the base for conducting the PNP transistor TR1 and a first relay RL1 actuated by a first amplifying switch SW1 as controlled by a timing control circuit including a master clock MC and a timing generator TG; with a cut-off resistor R1 connected between the base of the PNP transistor TR1 and the positive pole of the primary capacitor Ca for providing a cut-off current of the base of the PNP transistor TR1 for turning off the transistor TR1.

2. A power supply circuit according to claim 1, wherein said first relay RL1 includes a photodiode LD1 electrically connected between the base of the PNP transistor TR1 and the negative pole of the primary capacitor Ca, and a light-emitting diode LD2 electrically connected to the first amplifying switch SW1 as controlled by the timing control circuit.

3. A power supply circuit according to claim 1, wherein said negative-pole on-off switch is a NPN transistor TR2 having an emitter connected to the negative pole of the primary capacitor Ca, a collector connected to the negative pole of a last secondary capacitor C3 of said plurality of secondary capacitors through a forward-current diode D6 and a base connected to the positive pole of the primary capacitor Ca through a current limit resistor R4 for providing a positive biasing voltage to the base for conducting the NPN transistor TR2 and a second relay RL2 synchronously actuated by the first amplifying switch SW1 as controlled by the timing control circuit including the master clock MC and the timing generator TG; said second relay RL2 electrically connected to said first relay RL1; with a cut-off resistor R3 connected between the base of the NPN transistor TR2 and the negative pole of the primary capacitor Ca for providing a cut-off current of the base of the NPN transistor TR2 for turning off the transistor TR2.

4. A power supply circuit according to claim 3, wherein said second relay RL2 includes a photodiode LD3 electrically connected between the base of the NPN transistor TR2 and the positive pole of the primary capacitor Ca, and a light-emitting diode LD4 electrically connected to the negative pole of the primary capacitor Ca and connected in series with the light-emitting diode LD2 which is connected to the first amplifying switch SW1 as controlled by the timing control circuit.

5. A power supply circuit according to claim 4, wherein said first amplifying switch SW1 is electrically connected to the positive pole of the primary capacitor Ca through a voltage stabilizing circuit VS; and electrically connected to the negative pole of the primary capacitor Ca through the light-emitting diode LD2 and the light-emitting diode LD4; whereby upon receiving of a timing instruction signal Q1 from the timing generator TG which receives clock pulses from the master clock MC, the first amplifying switch SW1 will be turned on to conduct the light-emitting diodes LD2, LD4 for lighting and conducting the photodiodes LD1, LD3 for turning on the PNP transistor TR1 and NPN transistor TR2 for charging the secondary capacitors C1, C2, C3 by transferring the charges as stored on the primary capacitor Ca, which is charged by a DC current as rectified by the rectifier.

6. A power supply circuit according to claim 3, wherein said master clock MC and the timing generator TG are electrically connected to and powered by a voltage stabilizing circuit VS including at least a Zener diode ZD with the voltage stabilizing circuit VS connected to the positive and negative poles of the primary capacitor Ca.

7. A power supply circuit according to claim 1, wherein each of said secondary capacitors has its positive conductor connected to an output positive terminal through a positive-terminal on-off switch, and a negative conductor of each of said secondary capacitors connected to an output negative terminal through a negative-terminal on-off switch, with the output positive terminals and the output negative terminals connected in parallel for an output voltage between each pair of output terminals; said positive-terminal on-off switch being a PNP transistor having an emitter connected to said positive conductor of said each of the secondary capacitors, a collector connected to the output positive terminal and a base connected to the negative conductor of said each of the secondary capacitors through a negatively biasing relay which is actuated by a second amplifying switch as controlled by the timing control circuit including the master clock and the timing generator; and said negative-terminal on-off switch being a NPN transistor having an emitter connected to said negative conductor of said each of the secondary capacitors, a collector connected to the output negative terminal and the base connected to the positive conductor of said each of the secondary capacitors through a positively biasing relay which is actuated by the second amplifying switch as controlled by the timing control circuit.

8. A power supply circuit according to claim 7, wherein said negatively biasing relay includes a photodiode electrically connected between the base of the PNP transistor of said positive-terminal on-off switch and the negative conductor of said each of the secondary capacitors, and a light-emitting diode electrically connected to the second amplifying switch as controlled by the timing control circuit.

9. A power supply circuit according to claim 7, wherein said positively biasing second relay includes a photodiode electrically connected between the base of the NPN transistor of said negative-terminal on-off switch and the positive conductor of said each of the secondary capacitors, and a light-emitting diode electrically connected to the negative conductor of said each of the secondary capacitors and connected in series with the light-emitting diode which is connected to the second amplifying switch as controlled by the timing control circuit.

10. A simplified power supply circuit of voltage amplifier comprises: a plurality of charging capacitors connected in series; each of said charging capacitors having a positive conductor connected to an input positive pole of an input voltage of direct current through a PNP transistor and having a negative conductor of said each of the charging capacitors connected to an input negative pole of the input voltage through a NPN transistor, said charging capacitors having an input positive pole and a negative pole connected in parallel;

said PNP transistor for each of said charging capacitors including: an emitter connected to the input positive pole, a collector connected to the positive conductor of said each of the charging capacitors, and a base connected to the input negative pole through a first relay; and said NPN transistor for each of said charging capacitors including: an emitter connected to the input negative pole, a collector connected to the negative conductor of the charging capacitor, and a base connected to the input positive pole through a second relay.

11. A power supply circuit according to claim 10, wherein each of said relays includes a photodiode and a light-emitting diode operatively actuated by a timing instruction signal as given from a timing control circuit including a master clock and a timing generator.

12. A power supply circuit according to claim 10, wherein said charging capacitors are connected to an output positive terminal Lc and an output negative terminal Ld, an output capacitor Co having a positive conductor connected to said output positive terminal Lc which is connected to a positive conductor of a first charging capacitor through a PNP transistor TR3, and a negative conductor of the output capacitor Co connected to said output negative terminal Ld which is connected to a negative conductor of a last charging capacitor through a NPN transistor TR4, having an output voltage V4 across the output positive terminal Lc and the negative terminal Ld which is an overall output voltage of the charging capacitors connected in series;

said PNP transistor TR3 having an emitter connected to the positive conductor of said first charging capacitor, a collector connected to the output positive terminal Lc, and a base connected to the negative conductor of said last charging capacitor through a relay SWd including a photodiode PD1 and a light-emitting diode LED1 actuated by a timing instruction signal given from a timing control circuit MC, TG for conducting the relay SWd and turning on the PNP transistor TR3; and said NPN transistor TR4 having an emitter connected to the negative conductor of said last charging capacitor, a collector connected to the output negative terminal Ld, and a base connected to the positive conductor of said first charging capacitor through said relay SWd including a photodiode PD2 and a light-emitting diode LED2 actuated by said timing instruction signal given from said timing control circuit MC, TG for conducting the relay SWd and the NPN transistor TR4 simultaneously with the conducting of said PNP transistor TR3 for outputting the charges as stored on the charging capacitors through the two output terminals Lc, Ld.

* * * * *